United States Patent
Fukushima et al.

(10) Patent No.: US 7,586,709 B2
(45) Date of Patent: Sep. 8, 2009

(54) READ WRITE OFFSET ERROR CORRECTION USING GEOMETRIC REFERENCE IN SELF SERVO WRITE PROCESS

(75) Inventors: Craig Fukushima, Monte Sereno, CA (US); Kishan K. Kumbla, Morgan Hill, CA (US); Mantle M. Yu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/904,967

(22) Filed: Sep. 28, 2007

(65) Prior Publication Data

US 2009/0086365 A1   Apr. 2, 2009

(51) Int. Cl.
G11B 21/02  (2006.01)
G11B 20/20  (2006.01)
G11B 5/596  (2006.01)

(52) U.S. Cl. .................. 360/75; 360/76; 360/77.02
(58) Field of Classification Search .............. None
See application file for complete search history.

(56) References Cited

U.S. PATENT DOCUMENTS

| | | | |
|---|---|---|---|
| 5,612,833 A | 3/1997 | Yarmchuk et al. | |
| 6,002,540 A | 12/1999 | Cunningham et al. | |
| 6,040,955 A * | 3/2000 | Brown et al. | 360/75 |
| 6,317,285 B1 | 11/2001 | Bi et al. | |
| 6,421,197 B1 | 7/2002 | Abdelnour | |
| 6,476,989 B1 | 11/2002 | Chainer et al. | |
| 6,519,107 B1 | 2/2003 | Ehrlich et al. | |
| 6,738,205 B1 | 5/2004 | Moran et al. | |
| 6,751,042 B2 * | 6/2004 | Bi et al. | 360/77.02 |
| 6,765,744 B2 | 7/2004 | Gomez et al. | |
| 7,061,709 B2 | 6/2006 | Oki | |
| 7,145,849 B2 | 12/2006 | Chang et al. | |
| 7,149,048 B1 | 12/2006 | Ray et al. | |
| 7,158,338 B2 | 1/2007 | Koski et al. | |
| 7,173,781 B2 | 2/2007 | Lim et al. | |
| 7,375,918 B1 * | 5/2008 | Shepherd et al. | 360/78.14 |
| 2002/0186494 A1 | 12/2002 | Sugiyama et al. | |
| 2005/0264917 A1 * | 12/2005 | Yano et al. | 360/75 |

FOREIGN PATENT DOCUMENTS

| | | |
|---|---|---|
| WO | WO-2005/015552 | 2/2005 |
| WO | WO-2007/004117 | 1/2007 |

OTHER PUBLICATIONS

Melkote, et al., "Modeling and Control for Self-servowriting in Hard Disk Drives: A Repititve Process Approach", *IEEE Magazine*, (2006),2005-2008.

Melkote, et al., "Modeling and Compensator Design for Self-servowriting in Disk Drives", *IEEE Magazine*, (2003),737-742.

Ye, et al., "Radial Error Propagation Issues in Self-Servo Track Writing Technology", *IEEE Transactions on Magnetics*, vol. 38, No. 5, (Sep. 2002),2180-2182.

* cited by examiner

*Primary Examiner*—Andrew L Sniezek

(57) ABSTRACT

A hard disk drive having a self servo write offset error correction mechanism to improve self servo write process is disclosed. In accordance with certain aspects of the present invention, there is provided a self servo write method that can measure an accurate position offset between the read-head element and write-head element incorporated in a disk drive before servo data is recorded on the disk provided in the disk drive.

2 Claims, 8 Drawing Sheets

READ WRITE OFFSET ERROR CORRECTION USING GEOMETRIC REFERENCE IN SELF SERVO WRITE PROCESS

TECHNICAL FIELD

The present invention relates generally to a method for writing servo patterns on a data disk storage device, and more particularly, to self servo writing of servo sector patterns on a data disk storage device using geometric referencing to correct read write offset errors.

BACKGROUND ART

In many processing and computing systems, magnetic data storage devices, such as disk drives are utilized for storing data. A typical disk drive includes a spindle motor having a rotor for rotating one or more data disks having data storage surfaces, and an actuator for moving a head carrier arm that supports transducer (read/write) heads, radially across the data disks to write data to or read data from concentric data tracks on the data disk.

In general, a magnetic transducer head is positioned very close to each data storage disk surface by a slider suspended upon an air bearing. The close proximity of the head to the disk surface allows recording of very high resolution data and servo patterns on the disk surface. Servo patterns are typically written with uniform angular spacing of servo sectors and interleaved data sectors or blocks. An example servo pattern includes circumferentially sequential, radially staggered single frequency bursts. Servo patterns provide the disk drive with head position information to enable the actuator, such as a rotary voice coil motor to move the head from starting tracks to destination tracks during random access track seeking operations.

Further, the servo patterns provide the disk drive with head position information to enable the actuator to position and maintain the head in proper alignment with a track centerline during track following operations when user data is written to or read from the available data block storage areas in the tracks on the disk surface.

Data transducer heads currently in use employ dual elements. An inductive write element having a relatively wide recording gap is used to write information into the data tracks, and a read element such as a magneto-resistive sensor having a relatively narrow playback gap is used to read information from the data tracks. With this arrangement data track densities equaling and exceeding for example 30,000 tracks per inch are possible.

Conventional servo patterns are written into the servo sectors of each disk using a servo writer at a point in the drive assembly process before the hard disk unit is sealed against particulate contamination from the ambient. Such conventional servo writing method has been largely replaced by a self servo writing method.

In the self servo writing methods, it is necessary to write the servo data precisely at a prescribed position on the disk. The head incorporated in the disk drive still utilizes the two discrete element, i.e., the read-head element and the write-head element. A position offset inevitably exists between these element. The position offset corresponds to the distance between the centerlines of the read and write head elements. Hence, the head-positioning control must be carried out in the self servo writing in accordance with the position offset between the read and write element.

More specifically, the position offset must be measured and the offset must be adjusted in accordance with the position offset measured in order to control the positioning of the head. Some conventional systems have been developed in which the position offset is measured by using a measuring pattern written on the disk. In this method, the measuring pattern is used, determining the distance between the centerline of the read-head element and one end of the write-head element and also the distance between the centerline and the other end of the write-head element. The distance from the centerline of the write-head element is obtained from the average of these distances determines. The position offset is then calculated.

Self servo write process also typically comprises the propagating of tracks radially across the surface as well as phase aligning the servo identification mark. One of the crucial aspects of radial propagation involves keeping the track pitch constant or follow a particular trajectory such that constant radial track pitch is maintained. Keeping the tracks equidistant involves a calibration process. Measuring amplitude of three consecutive tracks A, B and C and computing (A+C)/B or APC while the head is centered on track B gives a relative track pitch that depends on the magnetic write width and read width.

The Self Servo Write process also uses a pre-determined APC profile that is measured with an external positioner system. This profile mimics the profile from a pusher written track with absolute constant radial track pitch. The tracks pitch written using a particular APC profile does not generate an absolute track pitch on a group of files. This is because the APC is a relative measurement of track pitch and the head dimensions vary widely. Since the physical separation of the read and write elements create a positional offset, the offset changes from the inner diameter (ID) to the outer diameter (OD) of the disk. This is because the geometry of the head and the actuator mounting with respect to the disks.

A read write offset (RWOFS) is a function of skew angle of the head. The self servo write process needs more than a particular offset at the start of the propagation and this offset needs to be monotonously increasing function. This feature is designed in to the heads for all self servo written drives. The APC and the PWOFS is a tightly coupled variable during the self servo write process. Controlling the track pitch means maintaining the APC to the target profile by changing the location of servo or changing the RWOFS during the radial propagation.

Various factors influence the quality of track pitch and consequently the generated RWOFS profile for the corresponding tracks. Coercivity, fly-height, low frequency TMR, affects the track pitch. There is also noise in the measurement of APC that forces the controller to have a large latency (low gain controller). These factors produce glitches in the actual APC profile accomplished during the self servo write process which in turn makes the RWOFS curve jittery.

After the self servo write process the product measures the RWOFS curve across the stroke of the actuator (ID to OD) to fit a polynomial. Since the polynomial determined is generally using few measurement points and is of a low order ($5^{th}$ order), it is not enough to account for actual jittery RWOFS profile generated by the self servo write process. This in turn affects the soft error rate to be higher. One of the major issues is a steep slope change of the RWOFS curve at the OD because of coercivity variation of the disk at the corresponding region.

The conventional method of error detection and correction of position offsets is inaccurate. It is therefore desired that the position offset between the read and write head elements be measured with high precision to perform successful self servo write process.

SUMMARY

In accordance with certain aspects of the present invention, there is provided a self servo write method that can measure an accurate position offset between the read-head element and write-head element incorporated in a disk drive before servo data is recorded on the disk provided in the disk drive.

In one embodiment, a first pass self servo write process is performed to propagate the maximum number of initial servo tracks on a disk surface while generating read to write offset errors that are corrected by a second pass self servo write process using geometric references to solve high frequency or jittery variations of the read to write offsets in a final servo track. In one embodiment, the second pass self servo write process in addition to scaling the final servo tracks to appropriate absolute pitch based on the ramp location, tunes the localized problem track pitch to produce a smooth varying read to Write offset profile that can be defined by a low order polynomial function.

BRIEF DESCRIPTION OF THE DRAWINGS

The accompanying drawings, which are incorporated in and constitute a part of the specification, illustrate embodiments of the invention, and together with the general description given above and the detailed description given below serve to explain the teachings of the invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for correcting read to write offset errors utilizing geometric referencing in a self servo write process in a disk drive.

Overview

In general, the HDD comb (also referred to as an E-block) serves as a platform on which the suspensions (compliant members containing sliders with recording heads) are mounted. The recording heads fly at a constant height (on the order of nanometers) above the disk surface tracking pre-written servo information. An HDD carriage assembly forms the primary motive mechanical system that enables a disk-drive to randomly access data to be written or recorded on the disk surfaces.

Figure 1:
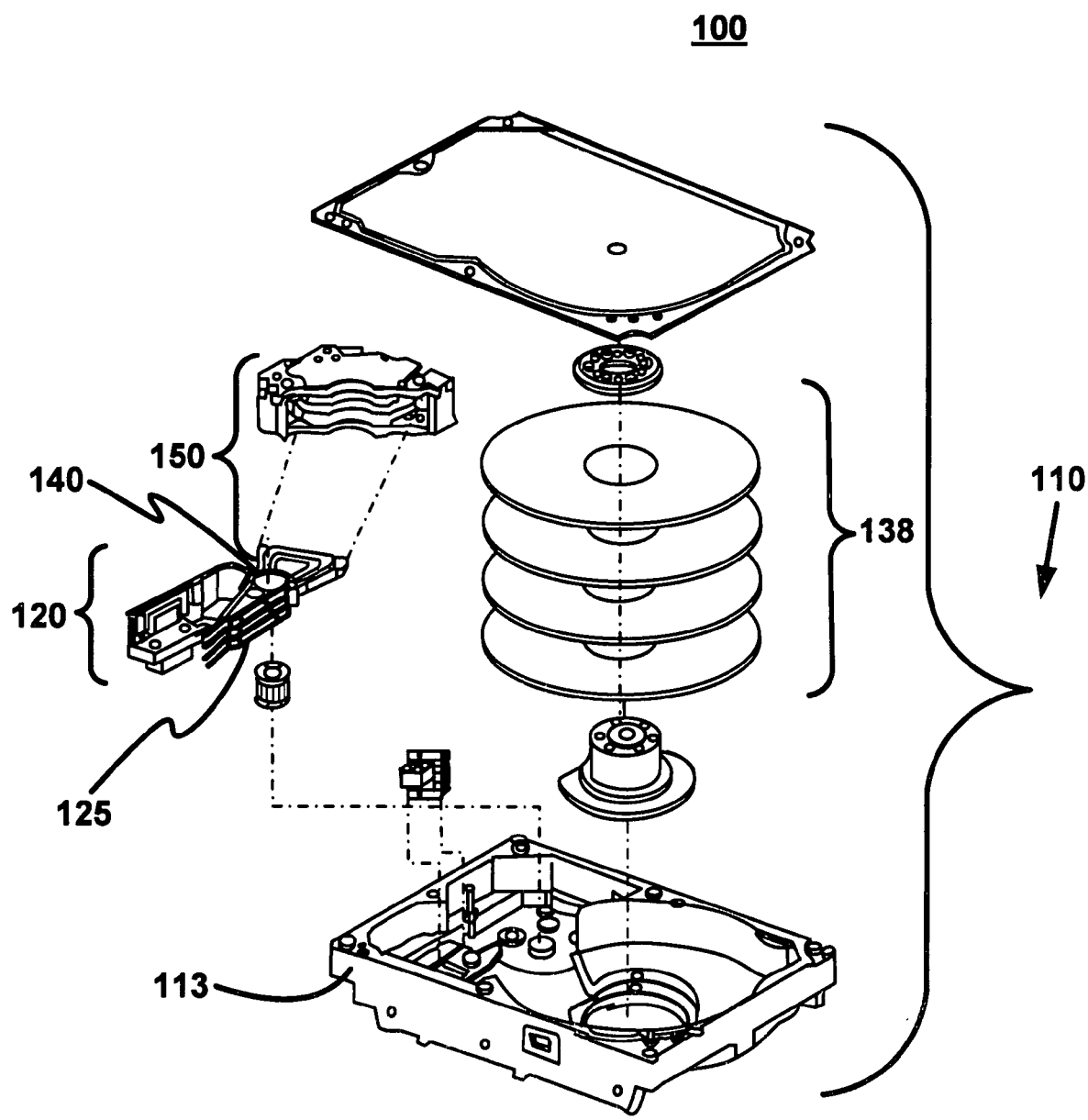
FIG. 1 is a plan view of an HDD with cover and top magnet removed with a serial identification label affixed to it in accordance with one embodiment of the present invention.

As shown in FIG. 1, the hard disk drive system 100 also includes a magnetic hard disk file or drive 110. The Hard disk drive 110 has an outer housing or base 113 containing a disk pack having at least one media or magnetic disk 138. The disk pack (as represented by disk 138) defines an axis of rotation and a radial direction relative to the axis in which the disk pack is rotatable.

A spindle motor assembly having a central drive hub 140 operates as this axis and rotates the disk 138 or disks of the disk pack in the radial direction relative to housing 113. An actuator 120 includes a plurality of parallel actuator arms 125 in the form of a comb that is movably or pivotally mounted to base/housing 113 about a pivot assembly 140. A controller 150 is also mounted to base 113 for selectively moving the comb of arms relative to the disk pack (as represented by disk 138). The hard disk drive system 100 further includes the read to write offset error correction mechanism of the present invention. To write servo optimal tracks on the disk 138 prior to the hard disk drive system being shipped to a customer.

Figure 2:
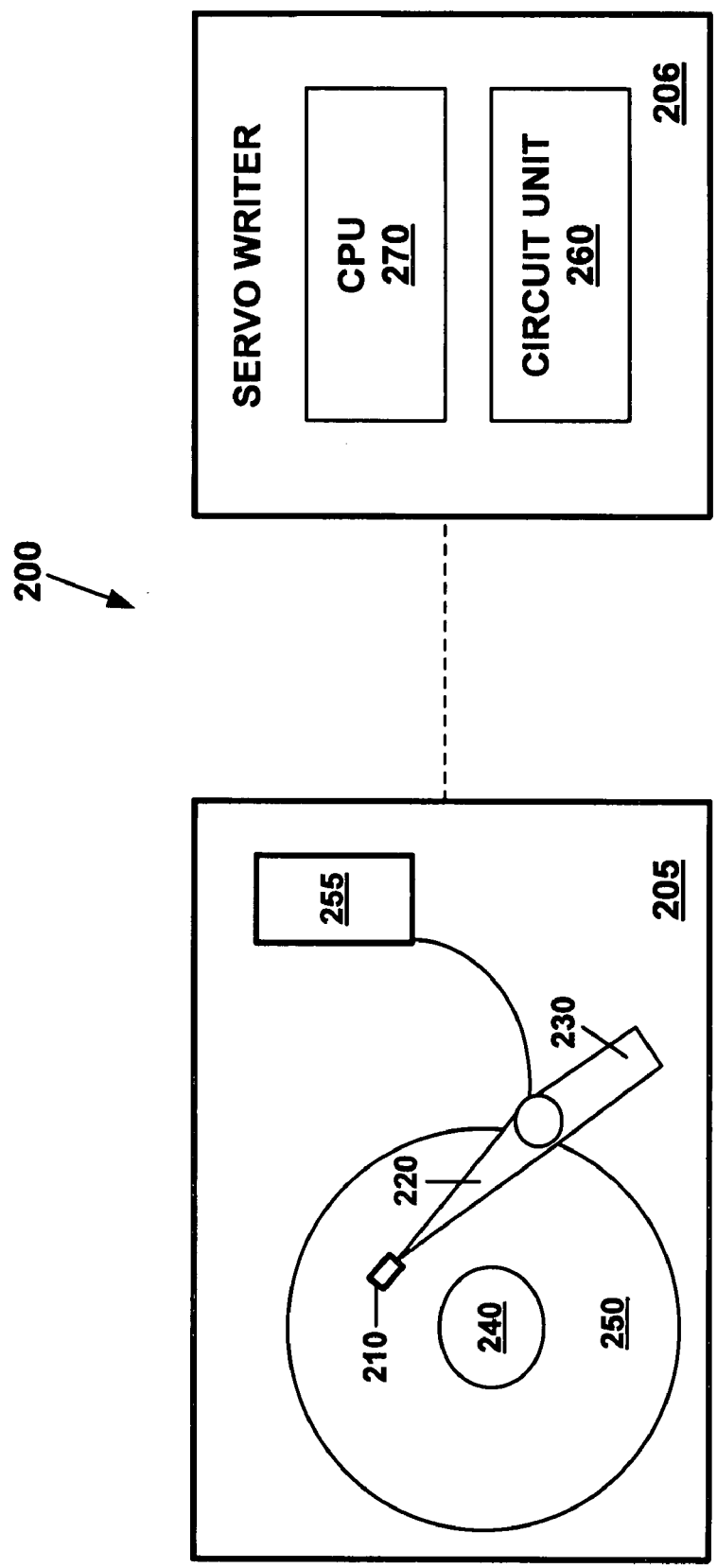
FIG. 2 is a block diagram illustration of major components of a disk drive and servo writer according to one embodiment of the present invention.

FIG. 2 is a block diagram illustration of one embodiment of components of a disk drive and a servo write in accordance with one embodiment of the present invention. As shown in FIG. 2, the disk drive comprises a head 210, an actuator 220, a voice coil motor 230, a spindle motor 240 and a disk 250.

The head 210 is mounted on the actuator 220. The disk drive 200 also comprises a circuit unit 260 in addition to the drive mechanism. The circuit 260 includes a head amplifier, a read/write channel, a microprocessor, a disk controller and the like, (all not shown).

In one embodiment, the actuator 220 moves in a radial direction of the disk 250 when driven by the VCM 230 for positioning the head 210 over the disk 250. The head 210 has a write-head element and a read-head element. The write-head element is designed to write data on the disk 250. The read-head element is also configured to read data from the disk 250. In one embodiment, the self servo write process of the present invention utilizes the write head element to record servo data in the desired tracks on the disk 250 during a two pass self servo write process. In one embodiment, a first pass self servo write process propagates initial servo tracks on the disk 250 to determine the maximum number of tracks that may be written to the disk 250.

In the first pass self servo write process, only the self servo write radial tracks are propagated from the crash-stops to the ramp location. The distance between the crash-stop and the ramp has a small sigma variation (order of 0.7% one sigma) compared with the head dimensions (order of 10% one sigma). The number of self servo write tracks propagated until the ramp gives a measure that can be utilized to write the final tracks to tightly controlled absolute units. This is performed during a second pass self servo write process where the servo identification marks are written using the timing propagation while serving on the self servo write tracks written in the first pass.

The second pass self servo write process propagates the optimal number of final tracks that have been corrected from the first pass for errors using geometric referencing to correct track pitch to generate a smooth geometric curve of the tracks written.

Figure 3:
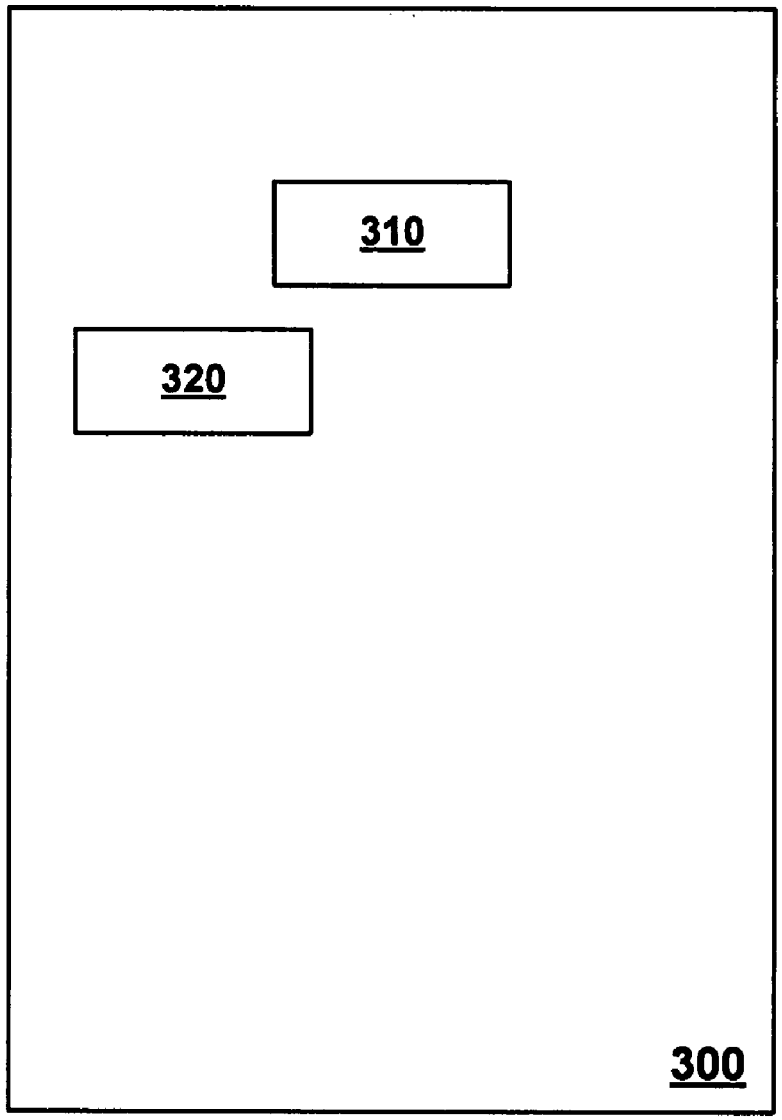
FIG. 3 is a block diagram illustration of the positional relation between the read-head element and the write-head element according to one embodiment of the invention.

With reference now to FIG. 3, one embodiment of the positional relation between the read-head element 310 and the write-head element 320 is illustrated. In the embodiment shown in FIG. 3, the read-head element 310 is physically separated from the write-head element 320. This separation results in a read to write offset (RWOFS) since the write head 310 is always ahead of the read-head element 320. Generally when the head goes from the outer diameter (OD) of the disk to the inner diameter (ID), the RWOFS is skewed.

The RWOFS is measured in a X and Y component as the resulting component depending on the angle changes from ID to OD. The RWOFS is thus purely geometrical and in manufacturing, the X and Y components of the offset could be changed. The changes to the X and Y components of the RWOFS depends on the dimensions of the head and how the head is manufactured.

In one embodiment of the present invention, the disk is propagated with as many tracks as possible during a first pass self servo write process. The propagation is performed until the ramp of the disk is encountered. During the first pass self servo write process, only radial tracks are written. The APC and the resulting localized read to write offset is measured and recorded. In one embodiment, the ID radius, the OD or ramp location radius, the zero skew radius and the raw write to read offset values are determined during the first pass self servo write process. This information enables a smooth geometric read to write offset profile to be generated.

An error between the actual read to write offset data from the geometric curve is also computed and the error is converted into an appropriate track pitch error taking into account with the linearization factor.

A second self servo write process is performed to determine the optimal number of tracks that should be written before the disk drive is shipped to the customer. During the second self servo write process, the individual track pitch is adjusted to make the write to read offset follow a smooth geometric read to write profile.

Figure 4:
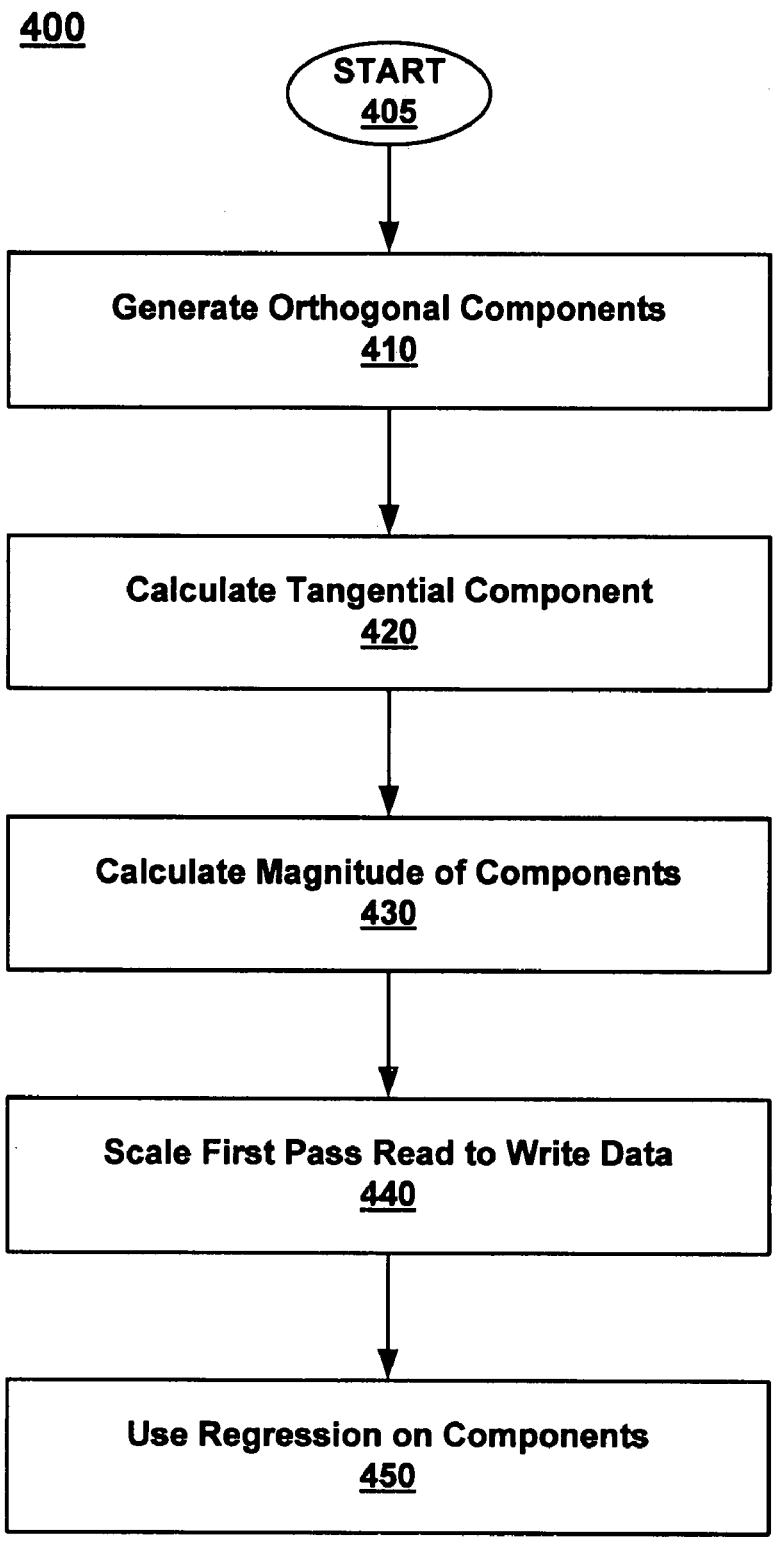
FIG. 4 is a flow diagram illustration of one embodiment of estimating the geometric read to write offset of one embodiment of the present invention.

Reference is now made to FIG. 4 which illustrates one embodiment of estimating the geometric read to write offset of one embodiment of the present invention. As illustrated in FIG. 4, estimating the geometric read to write offset require generating 410 two orthogonal components for an effective read to write offset.

The tangential component of the two orthogonal components is then calculated 420. The tangential component is the read to write separation which is equivalent to the time difference between a write of data or synch field and reading the same data or synch field. The radial component is perpendicular to the separation.

The magnitude of the two orthogonal components is then calculated 430. The magnitude of the two components makes up the resulting read to write offset that varies from ID to OD based on the skew angle of the actuator.

The first pass read to write data is then scaled 440 by taking into account the ID crash-stop and ramp location to determine the zero skew radius data point. At the zero skew, the read to write offset comprises of only the tangential component and this location is fixed for a particular product design.

Using regression 450, a geometric component of the read to write offset is determined and a geometric read to write offset trajectory is created using the geometry of the file (e.g., pivot to head distance, pivot to spindle distance, ramp location radius, ID crash-stop radius across from ID to OD).

The error between the geometric and actual is then corrected 460 on the second pass self servo write process by determining the track error before writing the track.

Figure 5:
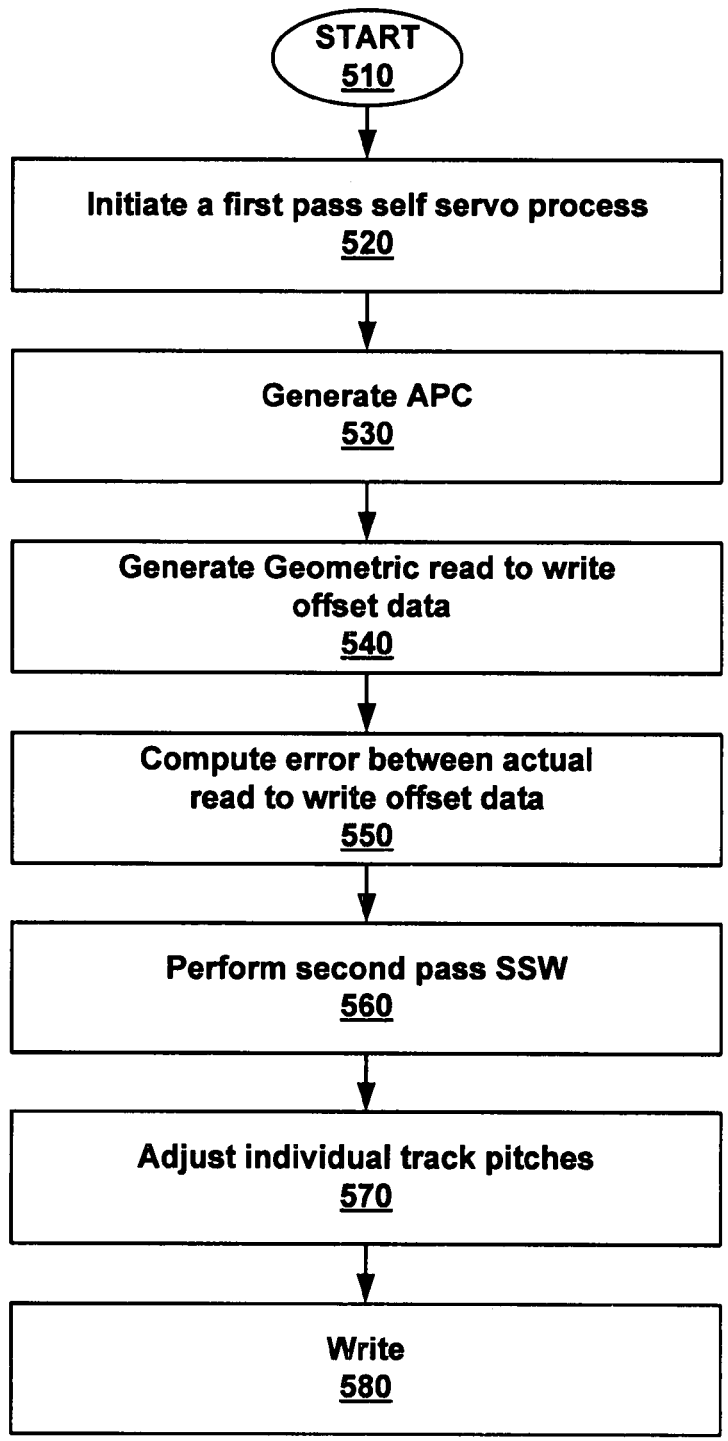
FIG. 5 is a flow diagram illustrating one embodiment of the geometric error correction method of the present invention.

FIG. 5 is a flow diagram illustrating one embodiment of the geometric error correction method of the present invention. In one embodiment of the present invention, because the read and write heads are separated by a physical distance results in an offset in terms of servo tracks that changes from ID to OD based on the skew angle of the head. The self servo write process uses the A+C/B or APC to quantify the DC track spacing.

The self servo write process follows a pre-determined APC profile in a close loop that mimics a constant radial track pitch. In one embodiment, several factors, including coercivity, fly-height, low frequency TMR, affects the local track pitch and therefore changes the read to write offset. The present invention alleviates this problem by conducting the two pass self servo write process 500 by initiating 520 a first pass self servo process to propagate the maximum number of initial tracks that may be written to a particular disk. During the first pass self servo write process only the self servo write radial tracks are written.

At step 530, the APC and resulting localized read to write offset is measured and recorded during the first pass self servo write process.

At step 540, a smooth geometric read to write offset profile is determined utilizing such factors as ID radius, OD or ramp location radius, zero skew radius and the raw read to write offset values from the first pass self servo write process.

At step 550 the error between the actual read to write offset data from the geometric curve is computed. This error is then converted into an appropriate track pitch error with the linearization factor taken into account.

At step 560, a second pass self servo write process is performed where the product SID is written at a track spacing determined during the first pass self servo write process. During the second pass self servo write process, the individual track pitch is adjusted to make the read to write offset follow a smooth geometric read to write profile.

Figure 6A:
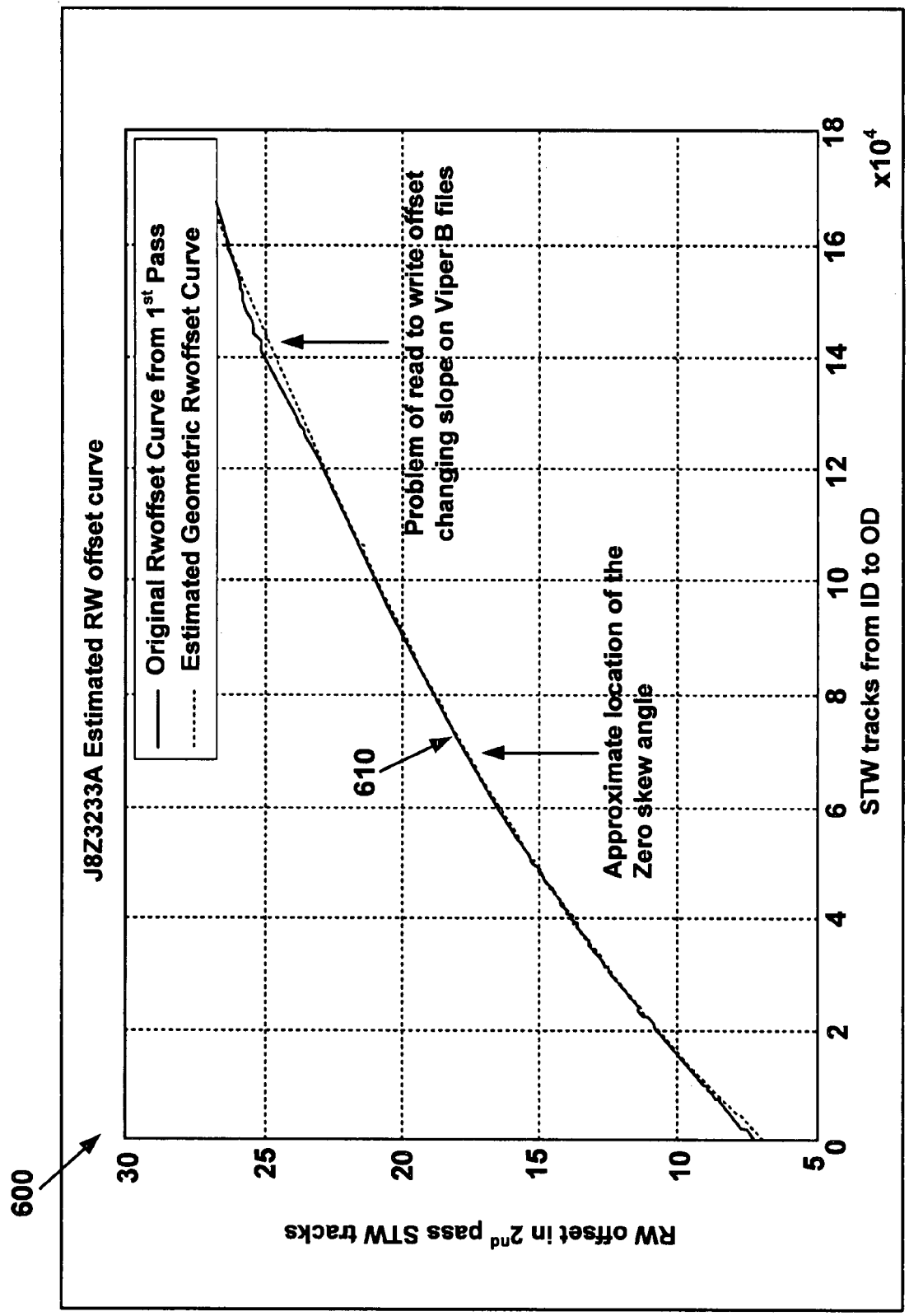
FIG. 6A is a graphical demonstration of how to determine the geometric read to write offset variation of one embodiment of the present invention.
Figure 6B:
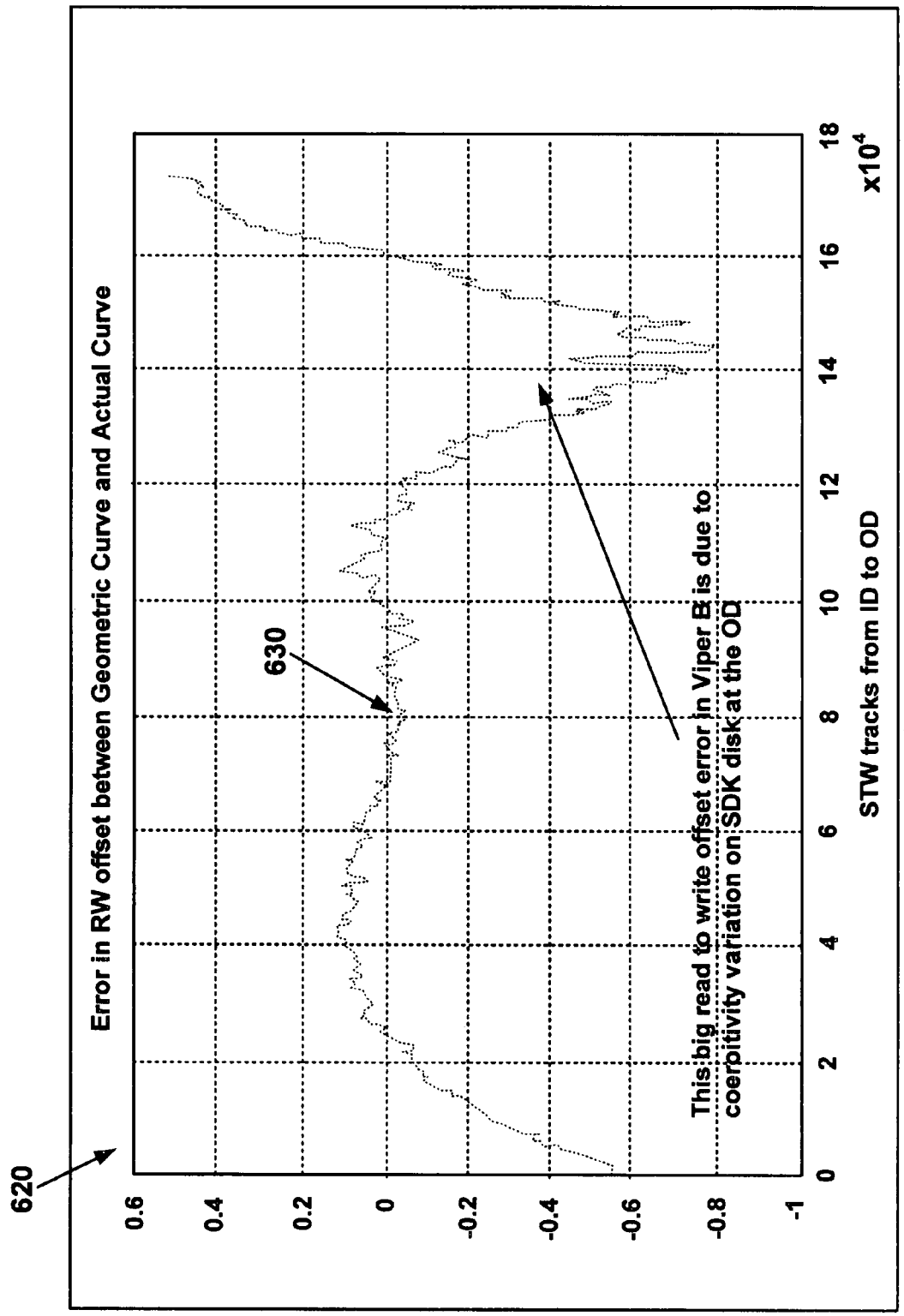
FIG. 6B is a graphical illustration of how to compute the error from the geometric and actual read to write offset of one embodiment of the invention.
Figure 6C:
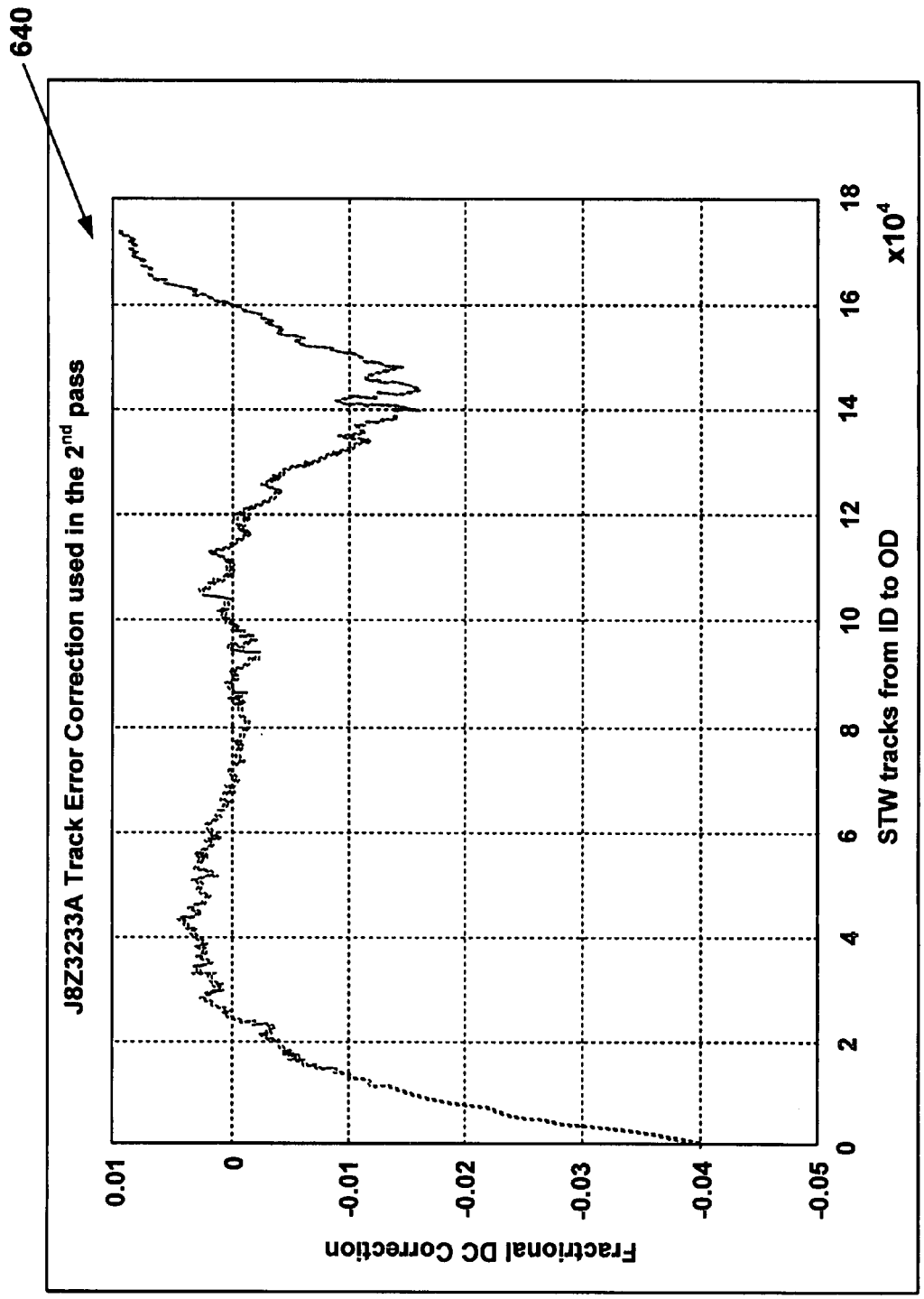
FIG. 6C is a graphical illustration of how to compute the DC track correction from the read to write offset error of one embodiment of the invention.

FIGS. 6A-6C illustrate one embodiment of an application of the second pass correction method of one embodiment of the present invention. FIG. 6A shows the relation that the number of STW tracks from ID to OD and the read to write offset have in a second pass STW when the geometric read to write offset variation is determine. FIG. 6B shows the relation that the error in read to write offset between geometric curve and actual curve and the number of STW tracks written from ID to OD. FIG. 6C shows the relation that the track error correction used in the second pass self servo write pass and the number of STW tracks written from ID to OD in computing the DC track correction from the read to write offset error and applying this to the second pass self servo write process along with linearity correction is done in order that the product tracks are written with the desired smooth track pitch.

Thus, embodiments of the present invention provide a method and apparatus for utilizing geometric reference to correct read to write offset errors during a self servo write process in a disk drive manufacturing environment.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A self servo write offset error correction method in a hard disk drive comprising:
    propagating a plurality of initial servo tracks to a disk in the hard disk drive during a first pass self servo write process;
    generating a plurality of localized read to write offset error information during the first pass self servo write process;
    generating a geometric read to write offset profile of said plurality of initial servo tracks;
    adjusting the read to write profile during a second pass self servo write process
    generating an error free read to write offset profile based on the adjusting of the read to write profile;
    generating two orthogonal components of each of the plurality of read to write offsets;
    determining a zero skew radius data point of the plurality of tracks written during the first self servo write process;
    computing a regression of the geometric components of the read to write offsets;
    computing errors between the geometric and actual components to correct the offset errors of the initial servo tracks during the second pass self servo write process;
    generating a raw read to write offset curve from the first pass self servo write process utilizing a variety of factors to iteratively determine ideal geometric variations of the read to write offset of a disk drive head utilized for the radial propagation of the initial servo tracks wherein the variety of factors include an inner diameter radius of the disk being servo written and wherein the variety of factors further include a ramp location radius of the disk being servo written and wherein the variety of factors further include an outer diameter radius of the disk being servo written and wherein the variety of factors further include a zero skew radius of the disk being servo written; and
    computing a localized track pitch correction factor utilizing an error between a geometric curve of the initial servo tracks propagated and an actual propagation curve of the initial servo tracks.

2. The self servo write offset error correction method of claim 1, further comprising applying the localized track pitch correction factor during the second pass self servo write process to write the final servo tracks at a desired track pitch.

* * * * *